US010937621B2

(12) United States Patent
Allen

(10) Patent No.: US 10,937,621 B2
(45) Date of Patent: Mar. 2, 2021

(54) TRIODE ELECTRON GUN

(71) Applicant: AcceleRAD Technologies, Inc., Belmont, CA (US)

(72) Inventor: Curtis Allen, Redwood City, CA (US)

(73) Assignee: ACCELERAD TECHNOLOGIES, INC., Belmont, CA (US)

( * ) Notice: Subject to any disclaimer, the term of this patent is extended or adjusted under 35 U.S.C. 154(b) by 0 days.

(21) Appl. No.: 16/290,504

(22) Filed: Mar. 1, 2019

(65) Prior Publication Data

US 2019/0272969 A1 Sep. 5, 2019

Related U.S. Application Data

(60) Provisional application No. 62/637,632, filed on Mar. 2, 2018.

(51) Int. Cl.

| | |
|---|---|
| ***H01J 29/48*** | (2006.01) |
| ***H01J 29/39*** | (2006.01) |
| ***H01J 29/04*** | (2006.01) |
| ***H02H 9/00*** | (2006.01) |
| ***H05H 9/00*** | (2006.01) |

(52) U.S. Cl.
CPC .............. *H01J 29/48* (2013.01); *H01J 29/04* (2013.01); *H01J 29/395* (2013.01); *H05H 9/00* (2013.01)

(58) Field of Classification Search
CPC .......... H01J 23/06; H01J 29/488; H01J 29/04; H01J 29/395; H01J 29/48; H05H 9/00; H05H 9/048
See application file for complete search history.

(56) References Cited

U.S. PATENT DOCUMENTS 10,115,556 B2 10/2018 Allen
2003/0117054 A1* 6/2003 Maeda ...................... H01J 1/13 313/310
2011/0006678 A1* 1/2011 Ferguson ................ H01J 25/14 315/5.35
2011/0006708 A1* 1/2011 Ho ........................... H05H 7/12 315/505
2016/0056006 A1* 2/2016 Allen ...................... H01J 29/04 313/449
2016/0056007 A1* 2/2016 Allen ...................... H01J 29/04 313/448

* cited by examiner

*Primary Examiner* — Joseph L Williams
*Assistant Examiner* — Jacob R Stern
(74) *Attorney, Agent, or Firm* — Tutunjian & Bitetto, P.C.

(57) ABSTRACT

Vacuum electron devices and linear accelerators include a hollow cathode configured to emit a beam of electrons. An anode is configured to attach and focus the beam of electrons. A control grid is configured to control the beam of electrons emitted from the hollow cathode. A cylinder is positioned substantially coaxial with the hollow cathode and is configured to maintain a shape and trajectory of the emitted beam of electrons.

19 Claims, 16 Drawing Sheets

TRIODE ELECTRON GUN

RELATED APPLICATION INFORMATION

This application claims priority to U.S. Provisional Patent Application No. 62/637,632, filed on Mar. 2, 2018, incorporated herein by reference herein its entirety.

BACKGROUND

The present invention generally relates to particle beam systems and, more particularly, to electron guns that can be used with vacuum electron devices.

Triode electron gun which have three electrodes, including a cathode, an anode, and control grid or modulating anode. The use of a control grid makes it possible to change electron beam current quickly and in a controlled fashion. However, when used to supply a linear particle accelerator (LINAC), some electrons entering the LINAC will be out of sync with the forward-accelerating fields and will instead be accelerated backwards toward the electron gun. These back-streaming electrons impact the electron gun's cathode and control grid, raising their temperature and potentially damaging them and causing dark currents.

SUMMARY

A vacuum electron device includes a hollow cathode configured to emit a beam of electrons. An anode is configured to attach and focus the beam of electrons. A control grid is configured to control the beam of electrons emitted from the hollow cathode. A cylinder is positioned substantially coaxial with the hollow cathode and is configured to maintain a shape and trajectory of the emitted beam of electrons.

A linear accelerator includes an electron gun and a set of resonant cavities that are configured to accelerate a beam of electrons. The electron gun includes a hollow cathode configured to emit a beam of electrons, an anode configured to attach and focus the beam of electrons, a hollow grid configured to control the beam of electrons emitted from the hollow cathode, and a cylinder that is substantially coaxial with the hollow cathode and that is positioned within the cathode and hollow grid, configured to maintain a shape and trajectory of the emitted beam of electrons.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to triode electron guns that address the emission of unwanted and uncontrolled electrons, particularly in the context of using an electron gun with a vacuum electron device (VED) such as a linear particle accelerator (LINAC), but it should be understood that the present embodiments can be used in any application that uses an electron beam.

Toward that end, some embodiments of the present invention employ a hollow cathode, a hollow post or cylinder, and a control grid with a center hole that receives the post. The grid's center hole and the hollow cathode provide the benefits of using a triode electron gun without the disadvantage of exposing the grid and cathode to back-streaming electrons and the heating caused by the impact of those back-streaming electrons.

Figure 1:
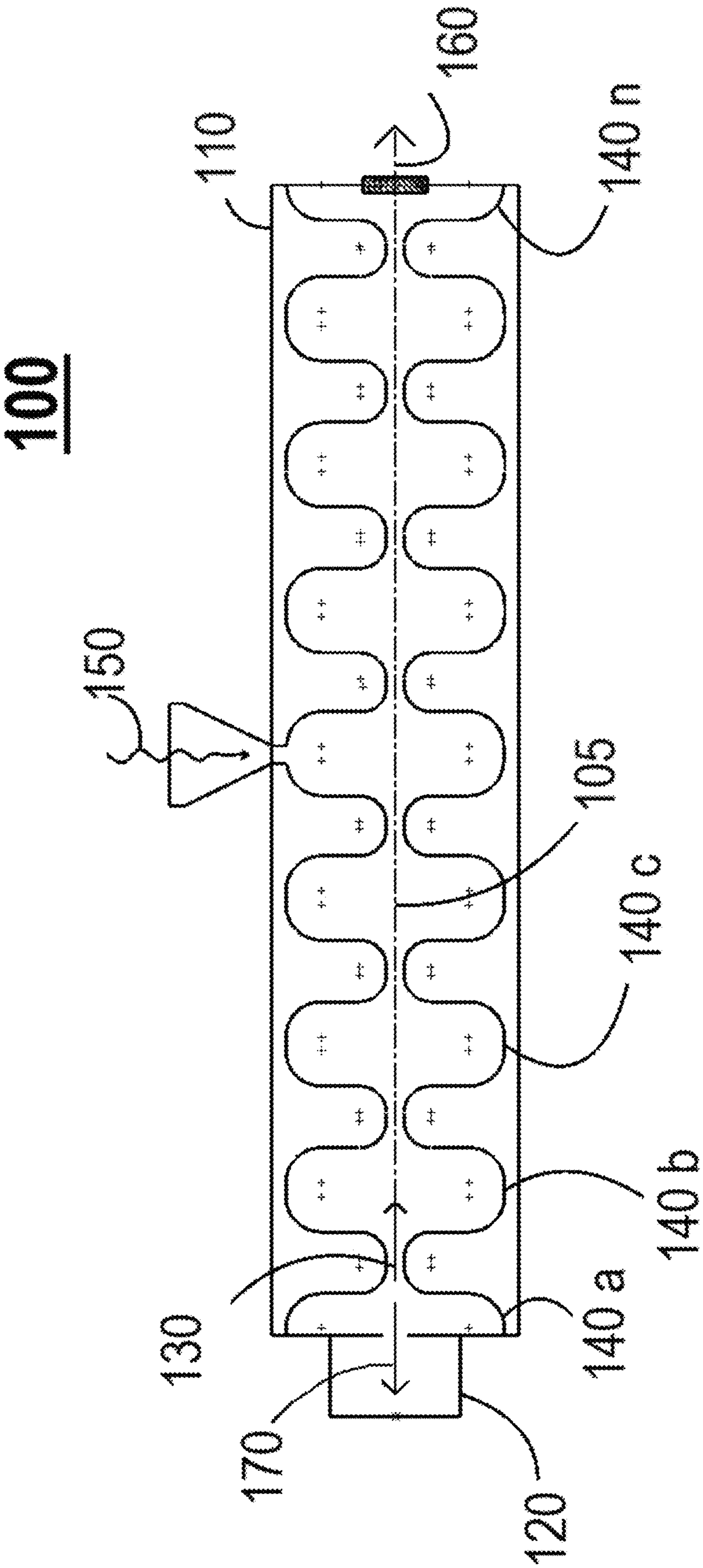
FIG. 1 is a diagram that shows a linear accelerator in accordance with an embodiment of the present invention.

Referring now to the drawings in which like numerals represent the same or similar elements and initially to FIG. 1, a cross-sectional view 100 of an exemplary LINAC 110 is shown. An electron gun 120 emits an electron beam 130 along an axis 105, which is the common axis for both the LINAC 110 as well as the electron gun 120. The electron beam 130 is accelerated through cavities 140 (labeled herein as 140*a*, 140*b*, . . . , 140*n*), which are powered by microwave power 150, also known as radio frequency power or electromagnetic power. The exemplary LINAC 110 thus produces a high-energy electron beam 160 as its output. It is to be noted that some of the electrons emitted from the electron gun 120 can arrive in the cavities of the electron linear accelerator at a wrong phase and thus they form an accelerated back-streaming beam of electrons 170.

Figure 2:
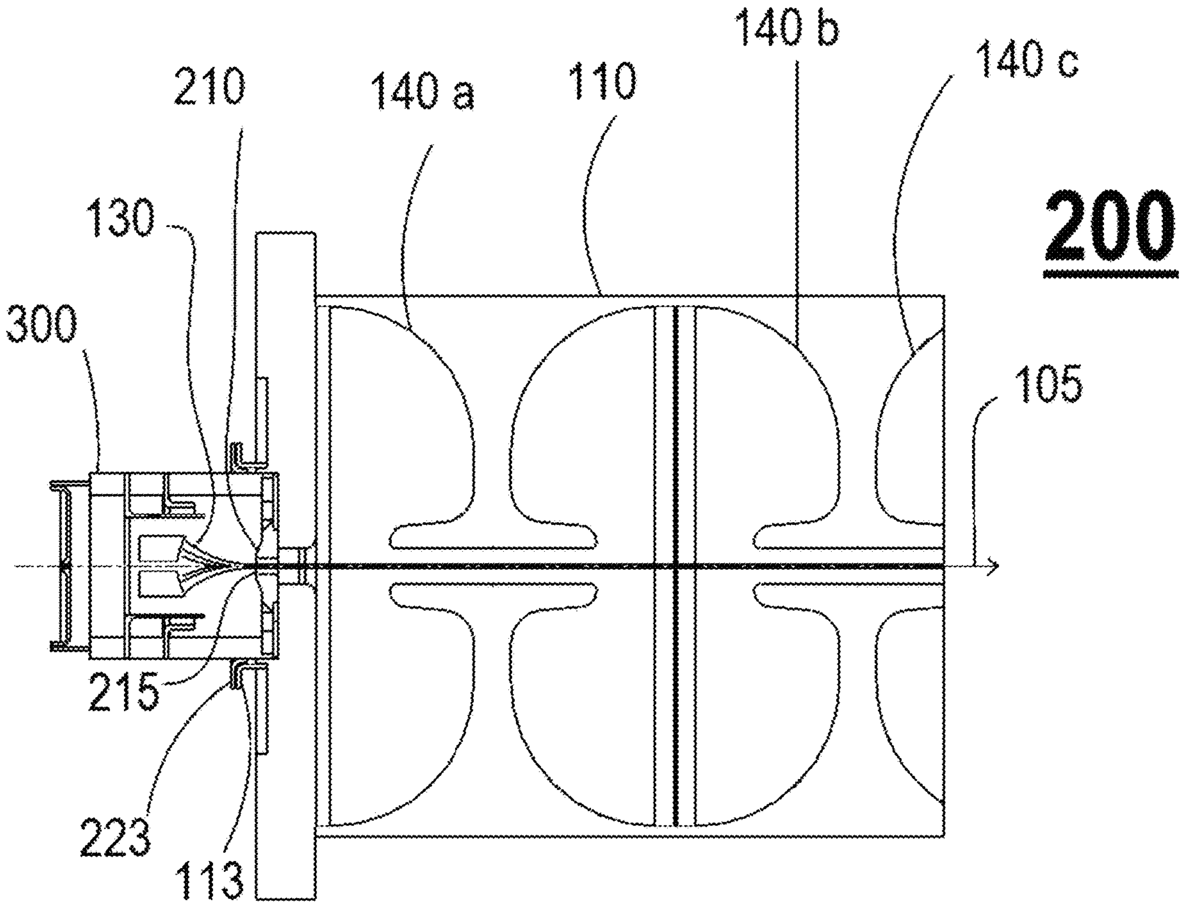
FIG. 2 is a diagram that shows an electron gun in relation to a set of resonating cavities in accordance with an embodiment of the present invention.

Referring now to FIG. 2, a cross-sectional view 200 of a hollow cathode electron gun 300 is shown. The hollow cathode electron gun 300 emits the electron beam 130 along the axis 105 towards an anode 210 which may be connected mechanically and electrically to the LINAC 110. The electron beam 130 passes through a center aperture 215 in the anode 210 into the LINAC 110. Only the first three cavities 140*a*, 140*b* and 140*c* of the LINAC 110 are shown in FIG. 2. The center of anode aperture 215 is aligned with the axis 105, which is the common axis for both the hollow cathode electron gun 300 and the LINAC 110. The hollow cathode electron gun 300 may be affixed to the LINAC 110 by mating a weld flange 223 of the hollow-cathode electron gun 300 to a weld flange 113 of the LINAC 110.

Figure 3:
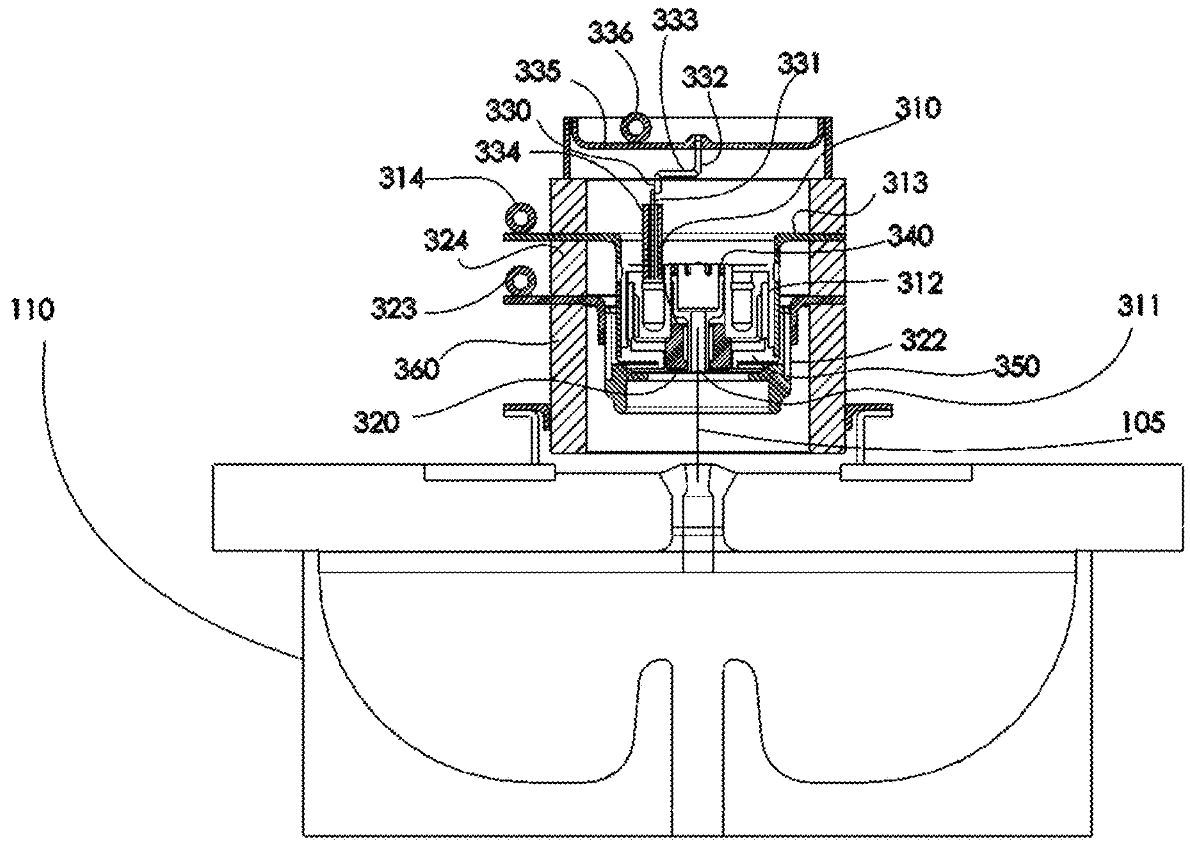
FIG. 3 is a diagram showing detail of an electron gun with a hollow cathode in accordance with an embodiment of the present invention.

Referring now to FIG. 3, additional details of the hollow cathode electron gun 300 are shown. The hollow cathode electron gun 300 includes a hollow cathode 310, a grid 320, a heating filament 330, a cylinder 340, a focusing electrode 350, and a high-voltage insulator 360 enclosing all the hollow-cathode electron gun's constituent components and all are centered on the axis 105 which is the common axis for both the hollow cathode electron gun 300 and the LINAC 110 (only the edge of the accelerator is shown).

The emitting surface of the hollow cathode 310 may have, e.g., a flat or planar shape or, alternatively, may have a convex shape or may be partially flat and partially concave or partially flat and partially conical, and includes a center hole 311 which is centered on the axis 105. The hollow cathode 310 may be made of a material that can emit electrons easily when heated to elevated temperatures, for example by thermionic emission. One exemplary material that can be used for the hollow cathode 310 is porous tungsten that is impregnated with a material, such as barium, that enhances electron emission by lowering the work function of the hollow cathode 310.

The hollow cathode 310 may be affixed in place by a cathode support 312 or by a series of support structures. The cathode support 312 may take the form of a metal tube, cylinder, and/or conical structure and can be formed from, e.g., molybdenum, molybdenum-rhenium, tantalum, or any other material having low vapor pressure. The cathode support 312 may be connected to a focus electrode 350 and to a cathode support sleeve 313, which may be formed from, e.g., molybdenum, molybdenum-rhenium, or any other suitable low vapor pressure material. The cathode support sleeve 313 acts to as a thermal choke, keeping the heat generated by the heating filament 330 from being thermally conducted away from the hollow cathode 310. This helps the hollow cathode 310 to achieve and maintain high temperatures (e.g., greater than 1000° C.). Similar structures can be used to maintain high temperatures in coated cathodes, oxide cathodes, reservoir cathodes and other types of cathodes used in electron guns. The hollow cathode 310 is connected to a power supply (not shown) through the cathode connector 314 The power supply provides the cathode with, e.g., a biasing negative voltage which is can be on the order of tens of kilovolts.

In some embodiments, the hollow cathode can be a "dispenser B cathode," which can be formed as a metal matrix of porous tungsten that is impregnated with a mixture of barium oxide (BaO), calcium oxide (CaO), and aluminum oxide ($2Al_2O_3$) having, for example, the mole-ratio of 5 BaO:3 CaO:$2Al_2O_3$. Other exemplary mole-ratios include 3:1:1, 4:1:1, and 6:1:2. Other impregnation ratios can also be used. Another type of dispenser cathode is a "dispenser scandate cathode," which is impregnated with scandium oxide ($Sc_2O$). Another cathode type is a dispenser B cathode with a thin layer of osmium-rhenium (Os—Re), which is known as an "M-coated cathode." A fourth cathode type is an "oxide cathode." Any of these cathode types, or any other appropriate cathode type, can be used in the present embodiments.

The control grid 320 can have a flat or planar shape or, alternatively, may have a convex shape or may be partially flat and partially concave or partially flat and partially conical, similar to the hollow cathode 310, and is placed in a close proximity, with an exemplary distance between a mil to 100 mils, to the emitting surface of the hollow cathode 310. The control grid 320 has the same shape, or approximately the same shape, as the hollow cathode 310 to achieve desired emission and beam trajectories 130. The position and shape of the grid 320, as well as its openings, are chosen to control the passage of the electrons emitted from the hollow cathode 310. Grid 320 can be secured by a metal supporting tube or cone, called a grid support 322, which can be made up of multiple components. Grid support 322 can be formed from, for example, molybdenum and/or the same material as the grid 320. The grid support 322 may be centered on the common axis 105 and represents an extension of a coaxial cavity, which is centered on the common axis 105. The grid support 322 can be fixed in position by brazing to the high voltage insulator 360, which may be made from alumina (about 94%-about 99.8% pure), and to a cathode-to-grid insulator 324, which may also be from alumina and which exits the vacuum wall, to provide a connection from a grid power supply (not shown) to the electron gun 300 at a grid connector 323.

The heating filament 330 is connected to a filament leg 331, which extends from the back of the hollow cathode 310 and is connected to a filament rod 332. The filament rod 332 can be formed from any appropriate metal, such as KOVAR® or nickel and may connect to a metal conductor ribbon 333 made of, e.g., platinum or another suitable metal. The filament rod 332 can be connected to a filament cap 335, for example by welding, such that the connection creates a hermetic seal and good electrical contact with a filament connector 336 that is connected to a filament power supply (not shown). The cathode connector 314 can be electrically isolated from the filament connector 336 by a filament-heater isolator 334 formed from, e.g., alumina.

When current is supplied to the heating filament 330, the filament wire increases in temperature due to resistive heating. The heat from the heating filament 330 is conducted to the hollow cathode 310, raising the temperature of the hollow cathode 310 and causing it to emit electrons from its impregnated surface. The presence of the focusing electrode 350 keeps unwanted electrons from emitting out the sides of the hollow cathode 310 and also helps focus the emitted electrons, from the face of the cathode, into an electron beam having electron trajectories 130 along the axis 105.

The cylinder 340 is positioned at the center of the hollow cathode 310 and can be fixed in place by welding, brazing or press-fitting into the cathode's inside diameter, or onto a suitable internal feature, like the cathode support 313. The presence of a structure like the cylinder 340 at the center of the hollow cathode 310, having the same potential voltage as the hollow cathode 310, stops the emission of electrons that have poor trajectories from the inside diameter of the hollow cathode 310. Instead of using cylinder 340, a structure that is conical, or a conic section, can be used instead. The cylinder 340 may be thermally isolated from the hollow cathode 310, but is electrically connected to the hollow cathode 310 to maintain both structures as the same potential.

Without a structure such as cylinder 340, electrons coming off the hollow cathode 310 would have collapsing trajectories under the absence of any space charge in the center of the emitted beam. A cylinder that has the same potential voltage the hollow cathode 310 will effectively repel electrons with the same potential voltage and keep the electron beam from collapsing, thereby improving the electron trajectories and providing for a well-behaved, converging electron beam that maximizes the beam transmission through the radio frequency structure.

Figure 16:
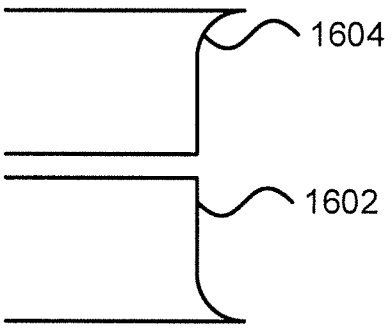
FIG. 16 shows a cross-sectional view of a cathode emitting surface that is partially flat and partially concave.

Referring now to FIG. 16, a cross-sectional view of a hollow cathode is shown. This view shows that the emitting surface may have a flat portion 1602 and a concave portion 1604.

Figure 17:
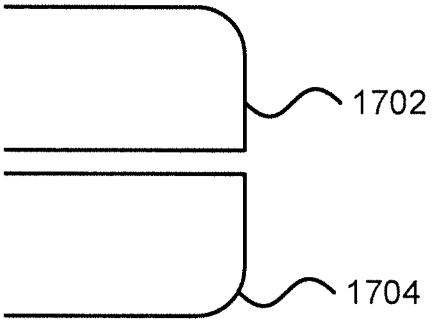
FIG. 17 shows a cross-sectional view of a cathode emitting surface that is partially flat and partially convex.

Referring now to FIG. 17, a cross-sectional view of a hollow cathode is shown. This view shows that the emitting surface may have a flat portion 1702 and a convex portion 1704.

Figure 4:
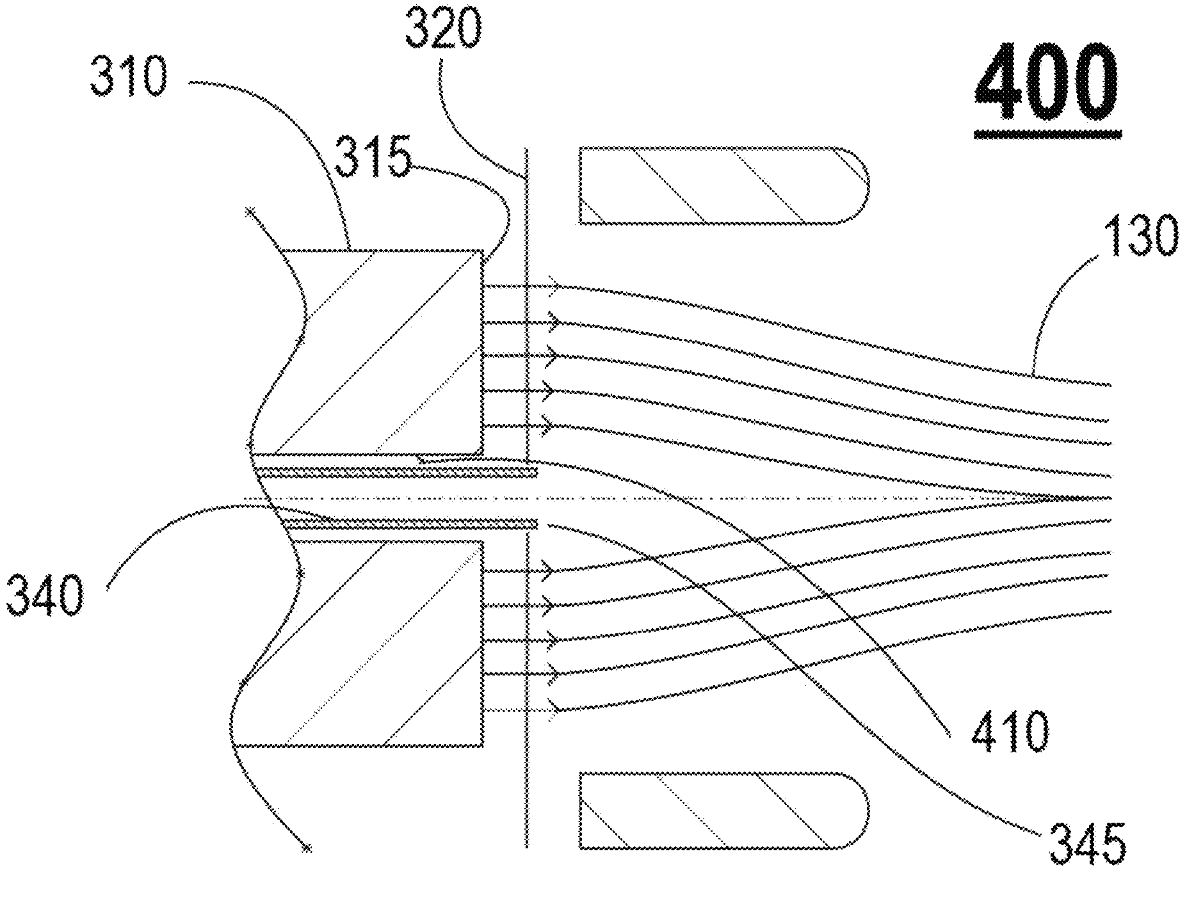
FIG. 4 is a diagram showing detail of an electron beam being emitted from a hollow cathode in accordance with an embodiment of the present invention.

Referring now to FIG. 4, a configuration 400 of a cylinder 340 with a hollow cathode 310 is shown. The electron beam 130 is emitted from a surface 315 of the hollow cathode 310. The hollow cathode 310 may be biased at a negative voltage potential on the order of tens of kilovolts and the grid 320 is pulsed positively to cause electrons to flow from the hollow cathode 310, forming the emitted electron beam 130. Because the hollow cathode 310 has no material in the center of its emitting face, the electron beam 130 initially takes the form of a hollow beam, with electrons leaving the surface of the hollow cathode 310 without filling the space at the center of the beam.

The cylinder 340 is positioned in the center of the hollow cathode 310 and may be electrically connected to the hollow cathode 310. Thus, both the cathode surface 315 and a cylinder surface 340 may have the same potential and may therefore inhibit any undesirable emission, such as electron rays 410, from the cathode's inside diameter.

A cylinder 340 that has a potential voltage that is the same as the hollow cathode 310 and that is positioned axially, such that the end of the cylinder 340 is in front of the hollow cathode 310, will effectively repel electrons with the same potential voltage and keep the electron beam 130 from collapsing, thereby improving the electron trajectories and providing for a well-behaved converging electron beam 130. The position of the cylinder relative to the grid 320 is also important, such that the gap between the two can be fully cut-off when the grid is pulsed negatively. Too large a gap will allow the field from the anode 210 to bend inward toward the cathode surface 315, allowing it to bias a small amount of electrons when the beam should be fully turned off.

In the presence of the impregnated hollow cathode 310, the cylinder 340 will eventually get coated with the impregnating material, such as barium, lowering the material's work function. As the back-streaming electrons impact the cylinder 340, they will result in an increase in temperature of the cylinder 340 and consequently cause emission of unwanted and uncontrolled electrons from the cylinder 340. The cylinder 340 can be formed from a material that reacts with the impregnating material to inhibit or completely stop emission, such as zirconium or hafnium. The cylinder 340 may alternatively be formed from molybdenum, tungsten, or another low vapor pressure material that is then coated (e.g., by sputtering, chemical vapor deposition, or other coating process) with a material to react with the impregnating material to inhibit electron emission.

In some embodiments, the cylinder 340 may be formed in the shape of a hollow cylinder or hollow cone, such that back-streaming electrons will impact the inside of the cylinder over a large surface area, providing for a lower power density and lower localized heating. The cylinder 340 can furthermore be thermally isolated from the hollow cathode 340 and can have a heat-sink path to keep the cylinder material from vaporizing or melting.

In some embodiments, the cylinder 340 can be positioned in a position that helps focus the electrons emitted from the hollow cathode 310 into a properly shaped electron beam. The cylinder 340 can also be positioned in a position that allows the electron beam 130 to be cut-off when the grid voltage is lowered or run at a slight negative voltage with respect to the cathode's voltage. For example, the cylinder 340 can be positioned on the axis 105 with a positional relationship to the cathode 310 and the grid 320. The degree to which the cylinder 340 sticks out of the hollow cathode 310 has an effect on the beam shape/profile and, together with the grid 320, can cut off the electron beam with the application of a voltage on the grid 320. The spacing in the grid pattern and the distance that the grid 320 and cylinder 340 are away from the hollow cathode 310 all play a role in determining the value of the voltage at which the electron beam will be cut off. For example, smaller spacings in the grid pattern/mesh and between the grid 320 and the cylinder 340 necessitate less voltage adjustment to cut off the electron beam.

Figure 5:
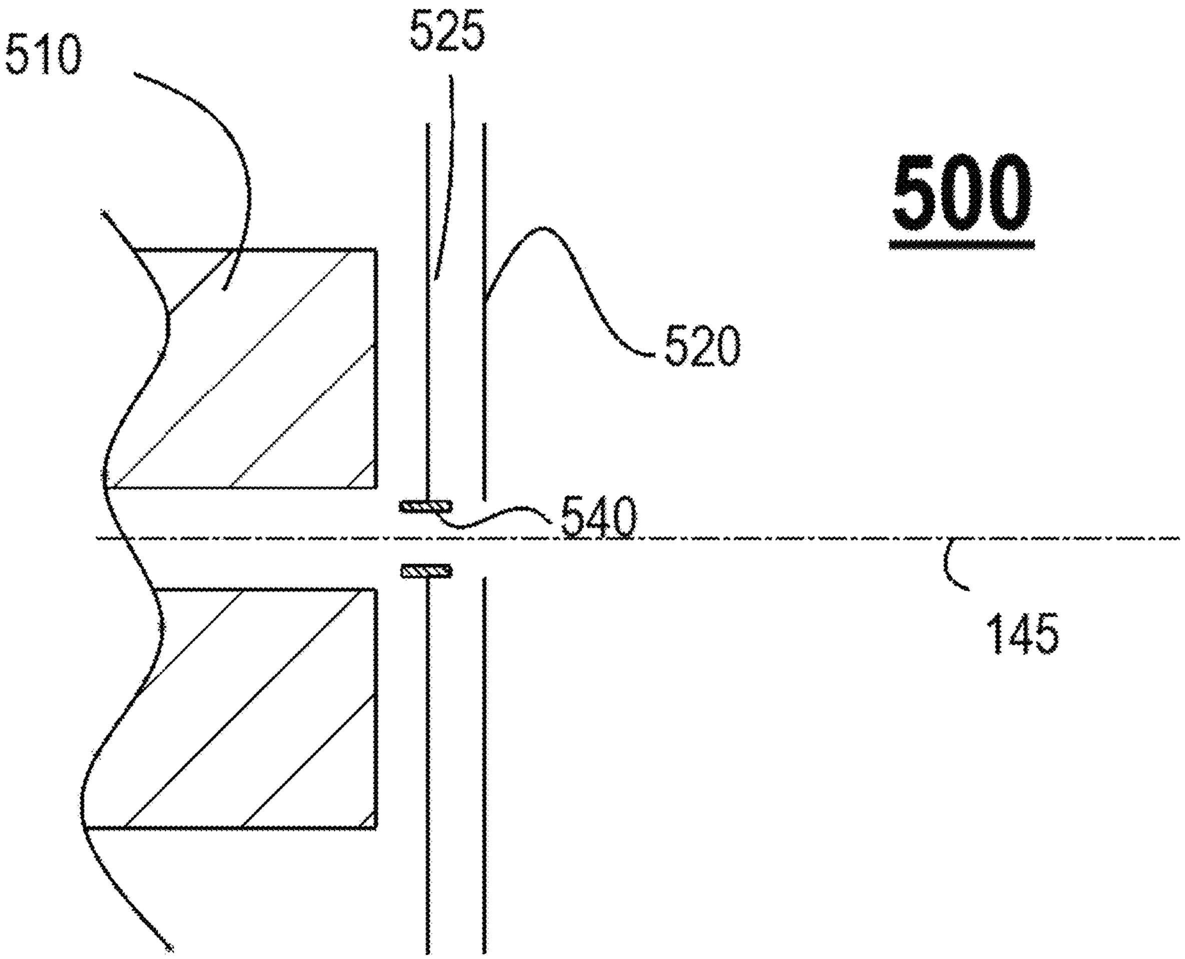
FIG. 5 is a diagram showing an exemplary configuration of an electron gun having a hollow cathode in accordance with an embodiment of the present invention.

Referring now to FIG. 5, a configuration of an electron gun 500 is shown. The electron gun 500 includes hollow cathode 510, hollow control grid 520, hollow shadow grid 525, and hollow cylindrical sleeve 540. All of the components of the electron gun 500 are centered on an axis 105. The hollow control grid 520 may have a concave shape, similar to the hollow cathode 510, and may be placed in a close proximity to the emitting surface of the hollow cathode 510. The hollow control grid may have approximately the same curvature, or the exact same curvature, as the hollow cathode 510 to achieve particular emission and trajectories for the electron beam 130. The position and shape of the hollow control grid 520, as well as its openings, can be selected to control the passage of the electrons emitted from the hollow cathode 510.

The hollow shadow grid 525 may be positioned between the cathode 510 and the hollow control grid 520 and may have exactly the same, or almost exact the same, grid pattern as the hollow shadow grid 520. The hollow shadow grid 525 may be configured to be aligned to mirror, or very closely mirror, the hollow control grid 520.

It should be understood that the hollow control grid 520 and the shadow grid 525 are represented in these figures to have a small number of repeated patterns, solely for the purpose of clarity of illustration. In actuality, each of the hollow control grid 520 and the hollow shadow grid 525 may be a two-dimensional rectangular mesh with tens or hundreds of openings that, in rectangular form, may have an exemplary size ranging from less than 0.005" by 0.005" to over 0.025" by 0.025" and that may have an exemplary thickness of 0.002-0.003". The grid and/or mesh pattern may also be, but is not limited to round, polygon, and/or a radial vane pattern with concentric rings and generally provides a transparency of greater than about 80%. The hollow control grid 520 and the shadow grid 525 may be formed from, e.g., molybdenum, tungsten, or any other appropriate low vapor pressure material and may be formed using any appropriate process, such as chemical etching or electrical discharge machining.

The presence of a hollow shadow grid 525 improves the performance of the hollow cathode electron gun 500. The hollow shadow grid 525 may be configured to be at same electric potential as the hollow cathode 510 so that electrons emitted from the hollow cathode 510 will not be attracted to the hollow shadow grid 525 and no electrons coming off the hollow cathode 510 will be intercepted by the hollow shadow grid 525.

When the hollow shadow grid 525 is aligned with the hollow control grid 520, the hollow shadow grid 525 keeps most of the forward moving electrons that would have been intercepted by the hollow control grid 520 from being intercepted. This significant reduction in the number of electrons that are intercepted by the hollow control grid 520 provides a substantial improvement in the operation of the hollow control grid 520 and allows the hollow control grid 520 to run at a temperature lower than what would be its temperature without having the hollow shadow grid 525. In the absence of the hollow shadow grid 525, for example, 10-20% of the current emitted from the cathode may be intercepted by a control grid. Additionally, the significant reduction in the number of electrons that are intercepted by the hollow control grid 520 provides a reduction in the power needed at the hollow control grid 520. Subsequently, a smaller and less expensive power supply can be used to bias the hollow control grid 520.

Furthermore, the hollow shadow grid 525 may be positioned between the cathode 510 and the hollow control grid 520. The shadow grid 525 shields the hollow control grid 520 from the significant amount of heat radiated from the hollow cathode 510 during operation, where the hollow cathode 510 can run at temperatures on the order of 1000° C.

The sleeve 540 may be a short, hollow cylinder that is mechanically coupled to the hollow shadow grid 525. The sleeve 540 may include a wall that has an exemplary thickness between about 0.005" and about 0.020" and that has an inner diameter of less than about 0.100". Since the hollow shadow grid 525 is configured to be at same electrical potential as the cathode 510, the sleeve 540 is subsequently also configured to be at same potential as the cathode 510 and will therefore inhibit any emission from the hollow cathode's inner surface. The sleeve 540 helps prevent electrons that have collapsing trajectories in the absence of any space charge in the center of the emitted beam. A sleeve 540 that has a potential voltage that is substantially same as the hollow 540 cathode will effectively repel electrons with the same potential voltage and keep the electron beam from collapsing, improving the electron trajectories and providing for a well behaved, converging electron beam.

The sleeve 540 may be centered on the common axis 105. In some embodiments, the sleeve 540 can be shaped as a hollow cylinder or a hollow cone, such that back-streaming electrons will impact the inner surface of the sleeve 540 over a large surface area, providing for a reduced power density and less heat created by the back-streaming electrons. The sleeve 540 may be positioned to help focus the electrons emitted from the hollow electrode 540, thereby enhancing convergence and laminarity of the emitted electron beam 130. The sleeve 540 can also be positioned to allow the electron beam 130 to be cut off when the voltage on the control grid 520 is lowered or run at a negative voltage with respect to the voltage of the hollow cathode 510. The positioning of the sleeve 540 relative to the control grid 520 and the hollow cathode 510 can control the cut-off voltage in the manner described above.

In the presence of the impregnated cathode, the sleeve 540 may eventually be coated with the impregnating material, such as barium, lowering the sleeve's material work function. As the back-streaming electrons impact the sleeve 540 coated with such material, they will result in an increase in temperature of the sleeve 540 and consequently emission of unwanted and uncontrolled electrons from the sleeve 540. In some embodiments, the sleeve 540 can be made of a material that reacts with the impregnating material, such as zirconium, hafnium, or another metal or composite, to inhibit or completely stop emission from the surfaces of the sleeve 540. In other embodiments, the sleeve 540 can be made from a material with a low vapor pressure, such as molybdenum or tungsten, and may then be coated with zirconium or another material that reacts with the impregnating material.

The cylinder of the sleeve 540 may be mechanically coupled to the hollow shadow grid 525, with a portion being extended on both the upstream and downstream side of the shadow grid 525, such that part of the short hollow cylinder of the sleeve 540 is positioned in the gap between the hollow shadow grid 525 and the hollow cathode 510 and the other part of the short hollow cylinder of the sleeve 540 is positioned in the gap between the hollow shadow grid 525 and the hollow control grid 520.

Figure 6:
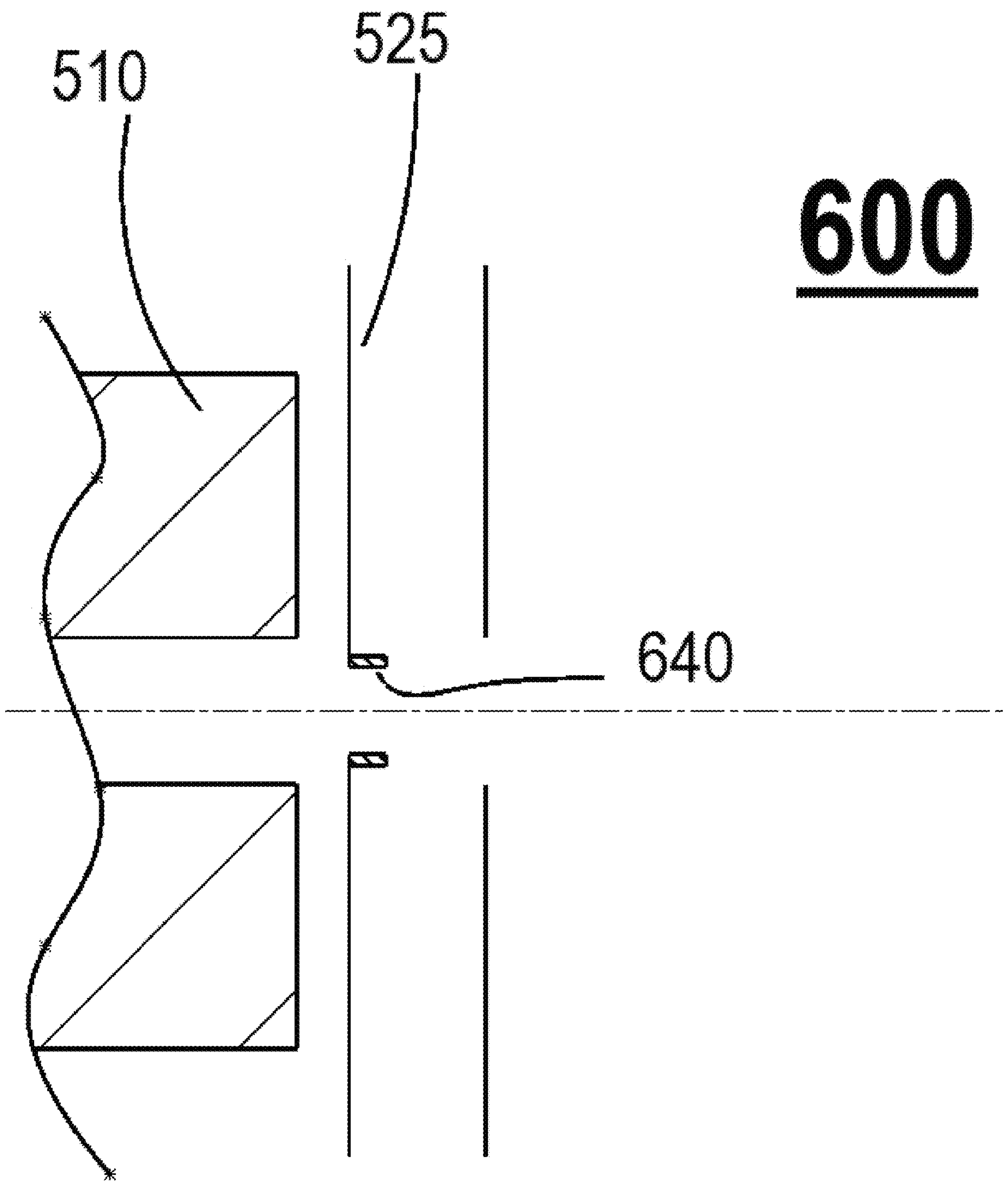
FIG. 6 is a diagram showing an exemplary configuration of an electron gun having a hollow cathode in accordance with an embodiment of the present invention.

Referring now to FIG. 6, another configuration of an electron gun 600 is shown, where a short hollow cylinder of the sleeve 640 is mechanically coupled to the hollow shadow grid 525 and extends only on the upstream side of the hollow shadow grid 525, such that the short hollow cylinder of the sleeve 640 in its entirety is positioned in the gap between the hollow shadow grid 525 and hollow cathode 510.

Figure 7:
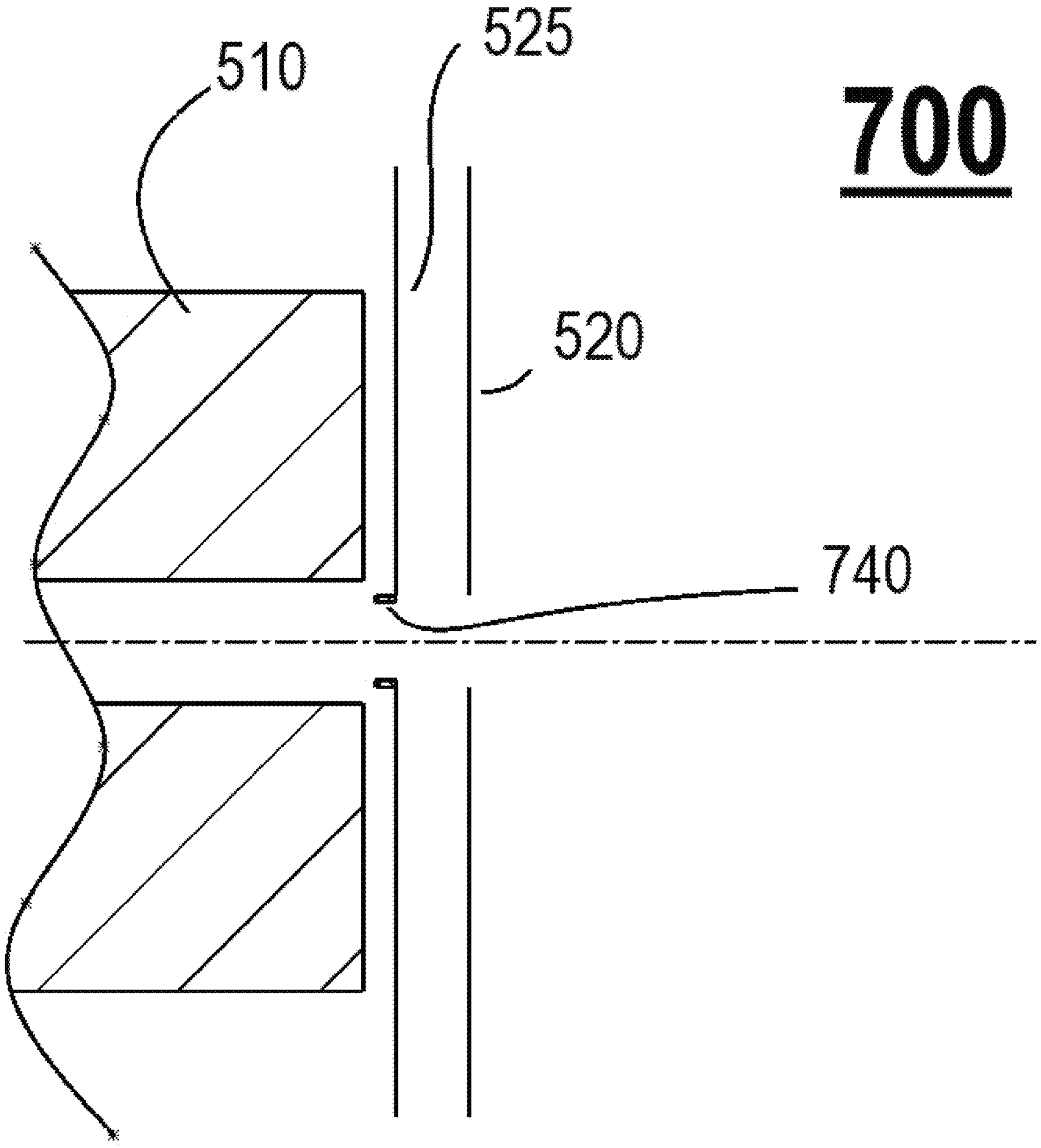
FIG. 7 is a diagram showing an exemplary configuration of an electron gun having a hollow cathode in accordance with an embodiment of the present invention.

Referring now to FIG. 7, another configuration of an electron gun 700 is shown, where a short hollow cylinder of the sleeve 740 is mechanically coupled to the shadow grid 525 and extends only on the downstream side of the shadow grid, such that the short hollow cylinder of the sleeve 740 in its entirety is positioned in the gap between the hollow shadow grid 525 and the hollow control grid 520.

Figure 8:
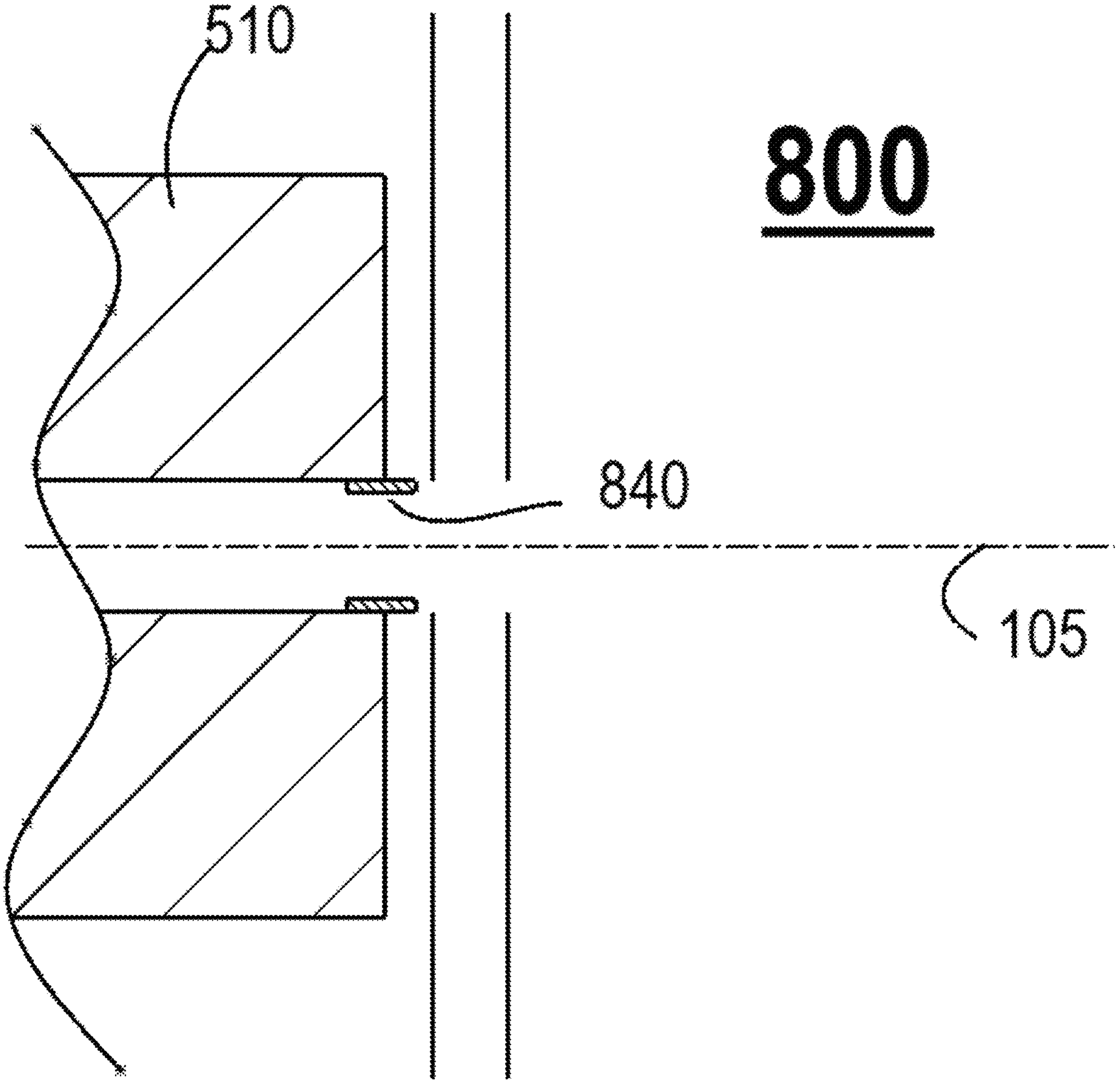
FIG. 8 is a diagram showing an exemplary configuration of an electron gun having a hollow cathode in accordance with an embodiment of the present invention.

Referring now to FIG. 8, another configuration of an electron gun 800 is shown, where a short hollow cylinder of the sleeve 840 is mechanically coupled to the inner surface of the hollow cathode 510. The sleeve 840 is thereby maintained at the same electrical potential as the hollow cathode 510 and is thermally coupled to it. This configuration ensures that the hollow cylindrical sleeve 840 is substantially centered on the axis of the triode hollow-cathode electron gun 105 and is configured to minimize the number of back-streaming electrons impacting its inside diameter. At the same time, the sleeve 840 increases the surface area impacted by the back-streaming electrons to lower the power density, thereby lowering the heat created by back-streaming electrons. The sleeve may be configured to help focus the electrons emitted from the hollow cathode into a properly shaped electron beam 130. In this embodiment, almost all of the electrons completely pass through the cathode hole and are collected on a heat sink (not shown) that is behind the cathode.

Figure 9:
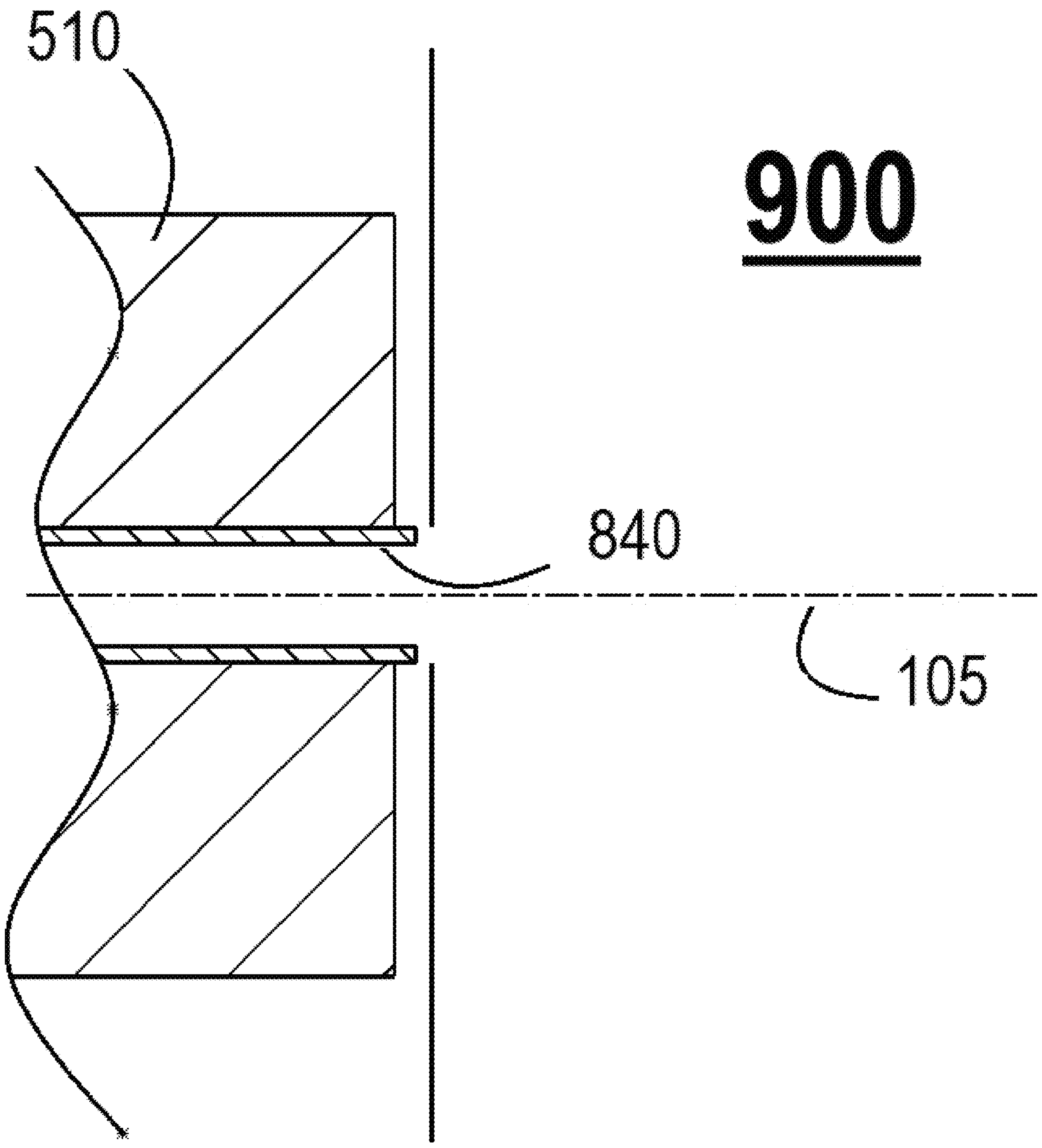
FIG. 9 is a diagram showing an exemplary configuration of an electron gun having a hollow cathode in accordance with an embodiment of the present invention.

Referring now to FIG. 9, another configuration of an electron gun 900 is shown, where the hollow cylindrical sleeve 840, which is centered on the axis of the triode hollow-cathode electron gun 105, but that extends deeply into the hollow cathode 510, still plays a favorable role in providing almost all of the back-streaming electrons a pass to a heat sink (Not shown). It is to be noted that this favorable performance can be achieved even in the absence of a shadow grid.

Figure 10:
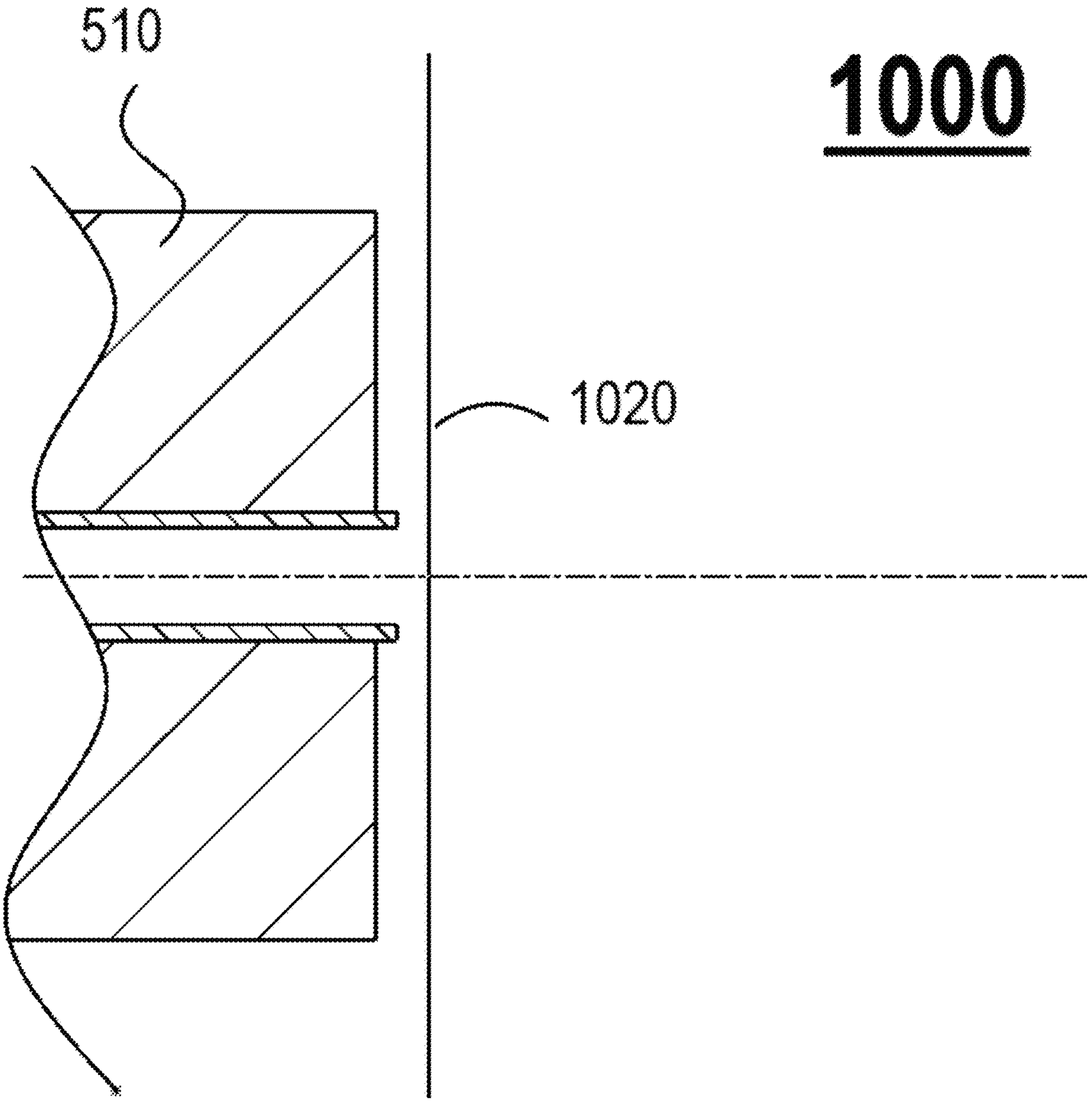
FIG. 10 is a diagram showing an exemplary configuration of an electron gun having a hollow cathode in accordance with an embodiment of the present invention.

Referring now to FIG. 10, another configuration of an electron gun 1000 is shown, where the hollow control grid shown 520 in FIG. 9 is replaced with a continuous control grid 1020 that has no centered hole. Although this type of grid will experience elevate temperatures in the centermost region, due to both forward emitted electrons and back-streaming electrons intercepting it, this configuration 100 will be easier to manufacture and align with a continuous control grid. The risk to the continuous control grid 1020 can be mitigated, and most of the back-streaming electrons will still pass through the hollow cathode.

Figure 11:
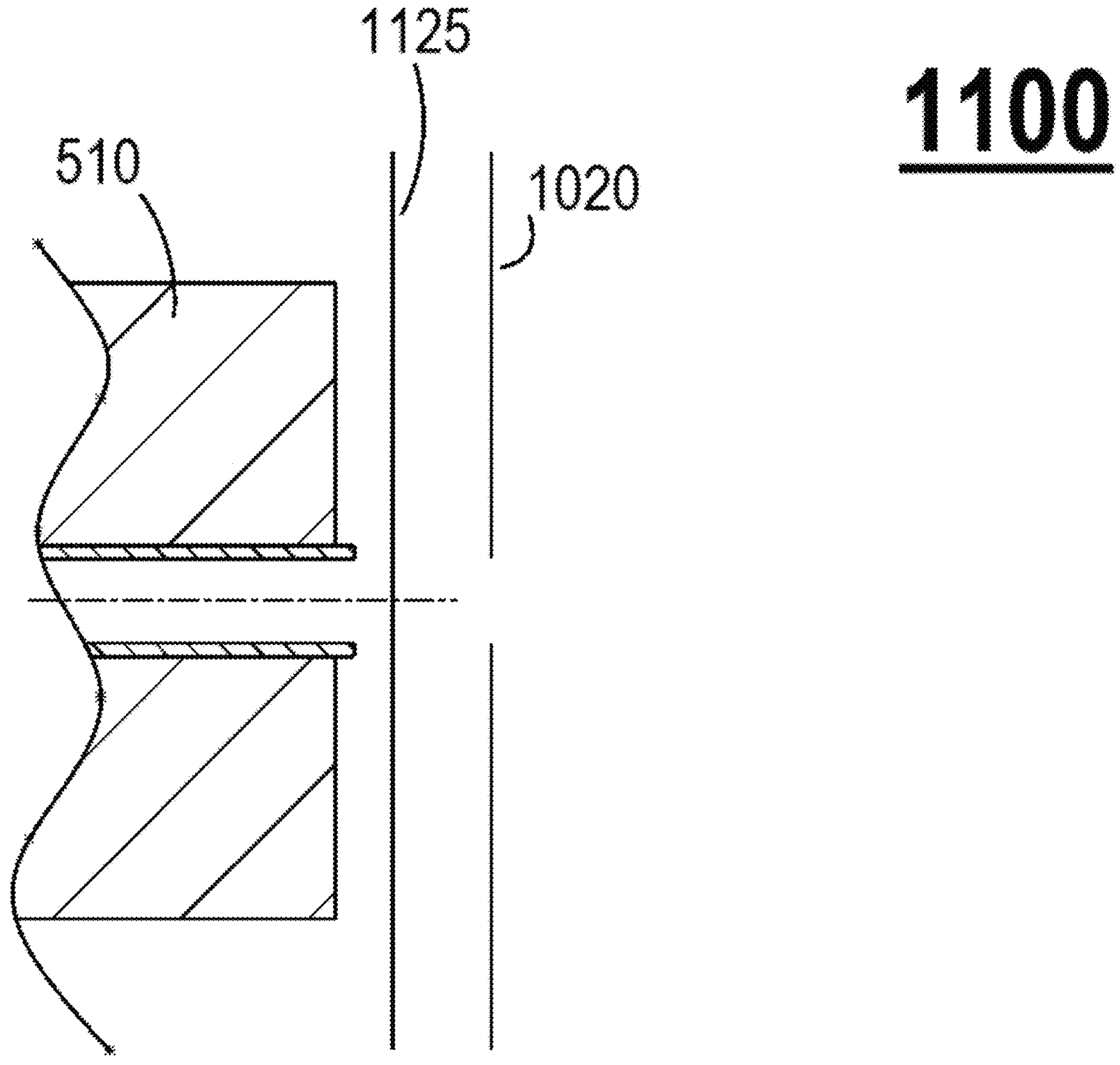
FIG. 11 is a diagram showing an exemplary configuration of an electron gun having a hollow cathode in accordance with an embodiment of the present invention.

Referring now to FIG. 11, another configuration of an electron grid 1100 is shown. A continuous shadow grid 1125 is added to the embodiment shown in FIG. 10, positioned between the hollow cathode 510 and the continuous control grid 1020. The continuous shadow grid 1125 has the exact same, or almost exactly the same, grid pattern as the continuous control grid and is configured to be aligned to mirror, or very closely mirror, the continuous control grid 1010. The shadow grid 1125 can be positioned to help focus electrons emitted from the hollow cathode 510 and to stop forward-emitted electrons from intercepting the control grid 1020. In some embodiments, the shadow grid can be positioned very close to the hollow cathode 510, for example about 0.002" away from the cathode's emitting surface. The closer the shadow grid 1125 is to the hollow cathode 510, the better the beam profile will be and the less the shadow grid 1125 will perturb the beam's path. Because the shadow grid 1125 is at the same potential as the hollow cathode 510, electrons that leave the cathode will generally not impact it. Instead, the electrons' paths will bend around the obstructions of the shadow grid 1125, causing the electrons to also miss impacting the control grid 1020.

Figure 12:
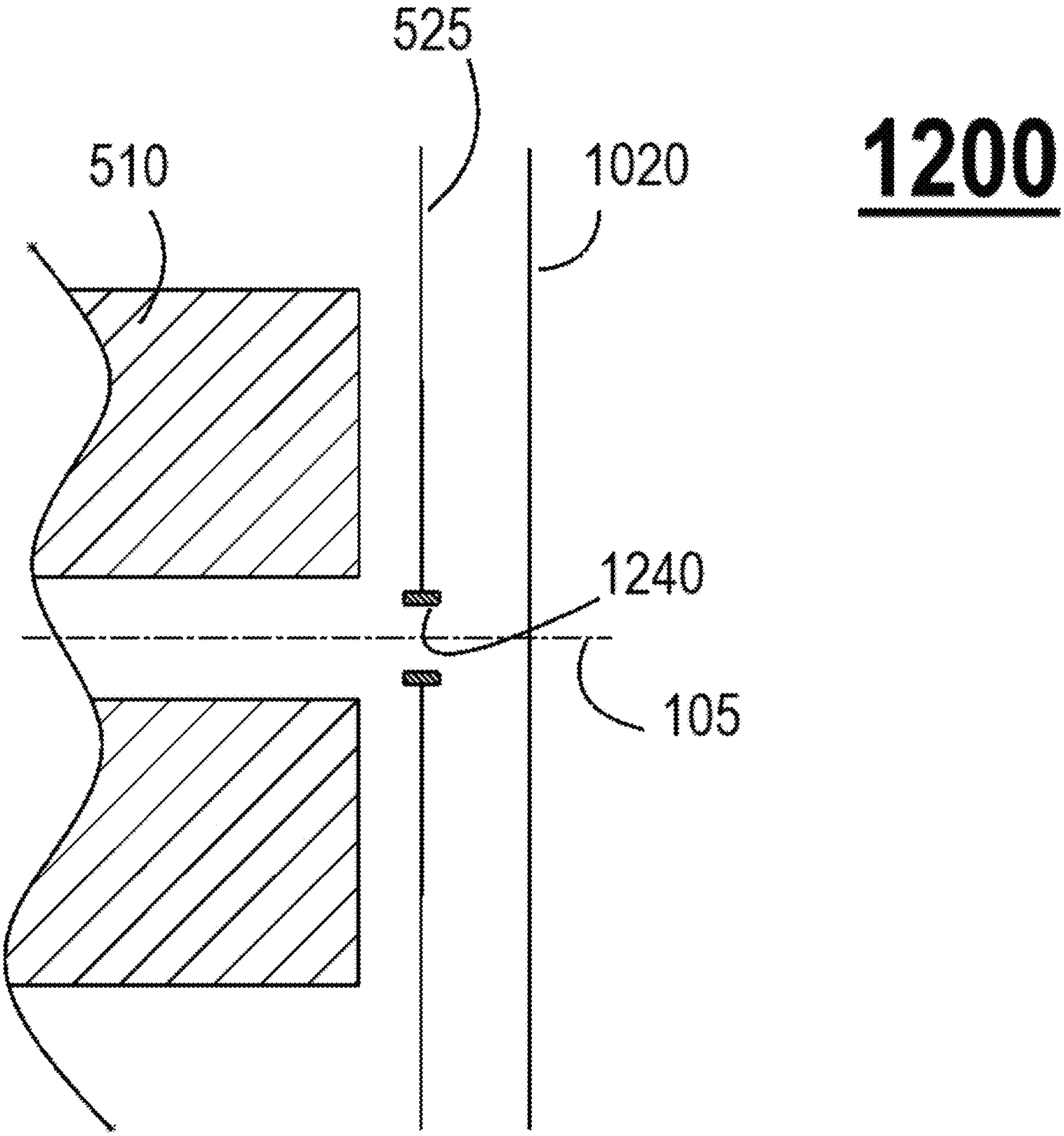
FIG. 12 is a diagram showing an exemplary configuration of an electron gun having a hollow cathode in accordance with an embodiment of the present invention.

Referring now to FIG. 12, another configuration of an electron gun 1200 is shown. A sleeve 1240 may be mechanically coupled to the hollow shadow grid 525. The sleeve 1240 may be a short hollow cylinder centered on the common axis 105 and may be held in this centered position relative to the hollow cathode 510 and the continuous control grid 1020. The sleeve 1240 may extend on both the upstream side and the downstream side of the hollow shadow grid 525, such that part of the short hollow cylinder of the sleeve 1240 is positioned in the gap between the hollow shadow grid 525 and hollow cathode 510 and the other part of the short hollow cylinder of the sleeve 1240 is positioned in the gap between the hollow shadow grid 525 and the continuous control grid 1020. The cylindrical portion used to focus the beam can thereby be kept aligned with the shadow grid.

Figure 13:
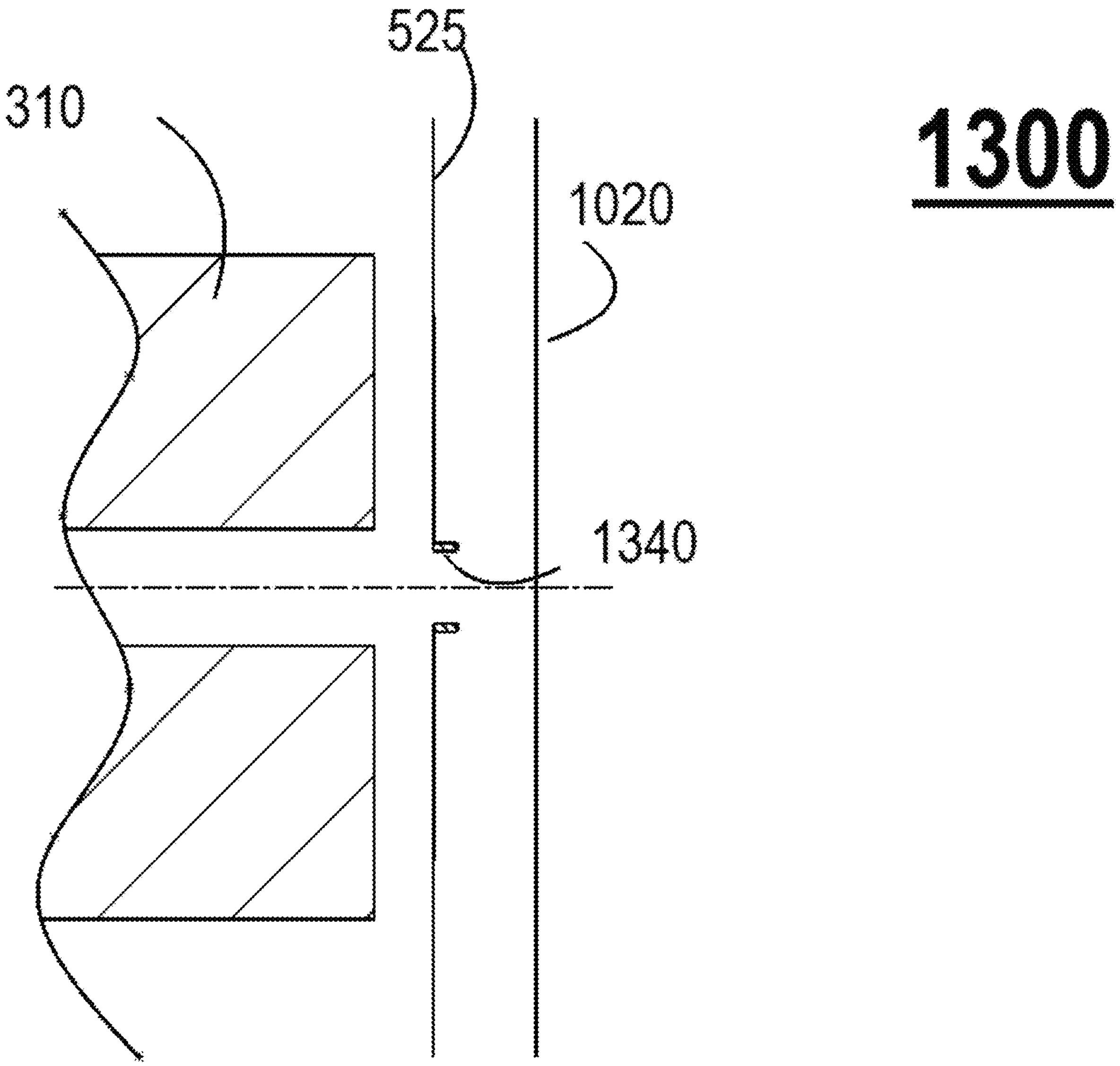
FIG. 13 is a diagram showing an exemplary configuration of an electron gun having a hollow cathode in accordance with an embodiment of the present invention.

Referring now to FIG. 13, another configuration of an electron gun 1300 is shown. A short hollow cylinder of the sleeve 1340 may be mechanically coupled to the shadow grid 525 and may extend only on the downstream side of the shadow grid, such that the short hollow cylinder of the sleeve 1340 in its entirety is positioned in the gap between the hollow shadow grid 525 and the continuous control grid 1020. This allows the shadow grid 525 to be placed very close to the cathode surface.

Figure 14:
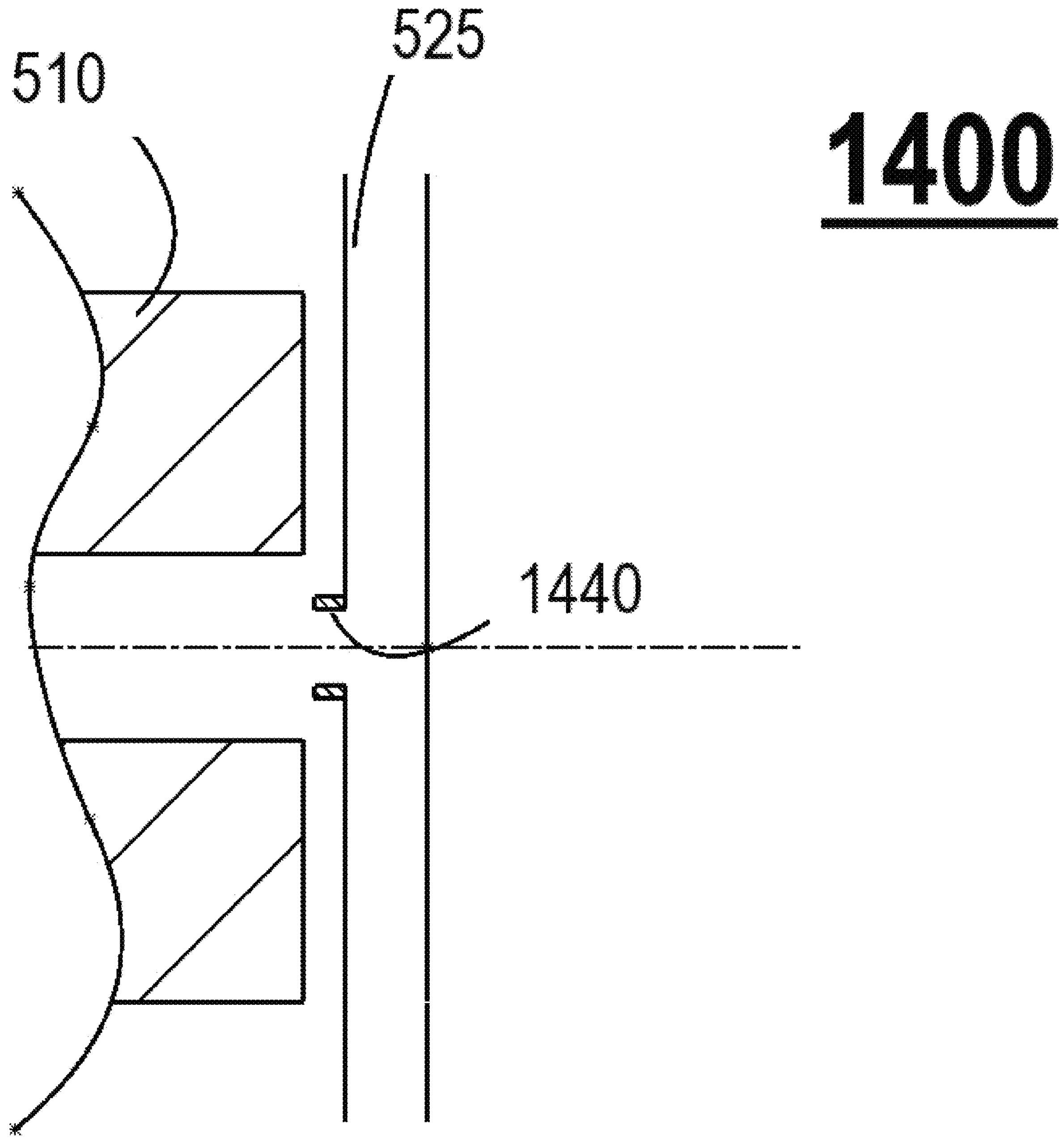
FIG. 14 is a diagram showing an exemplary configuration of an electron gun having a hollow cathode in accordance with an embodiment of the present invention.

Referring now to FIG. 14, another configuration of an electron gun 1400 is shown. A short hollow cylinder of the sleeve 1440 may be mechanically coupled to the hollow shadow grid 525, such that the sleeve extends only on the upstream side of the hollow shadow grid 525. The short hollow cylinder of the sleeve 1440 may thus be positioned in its entirety in the gap between the hollow shadow grid 525 and hollow cathode 510.

The present embodiments provide for easy alignment of the sleeve (e.g., 540, 640, 740, 840, 1240, 1340, or 1440) relative to the hollow cathode 510 during manufacturing, keeping the sleeve aligned and centered on the axis 105 of the electron gun. Further, the use of a shadow grid and/or sleeve, as described above, provides for superior performance of an electron gun with a hollow cathode.

Figure 15:
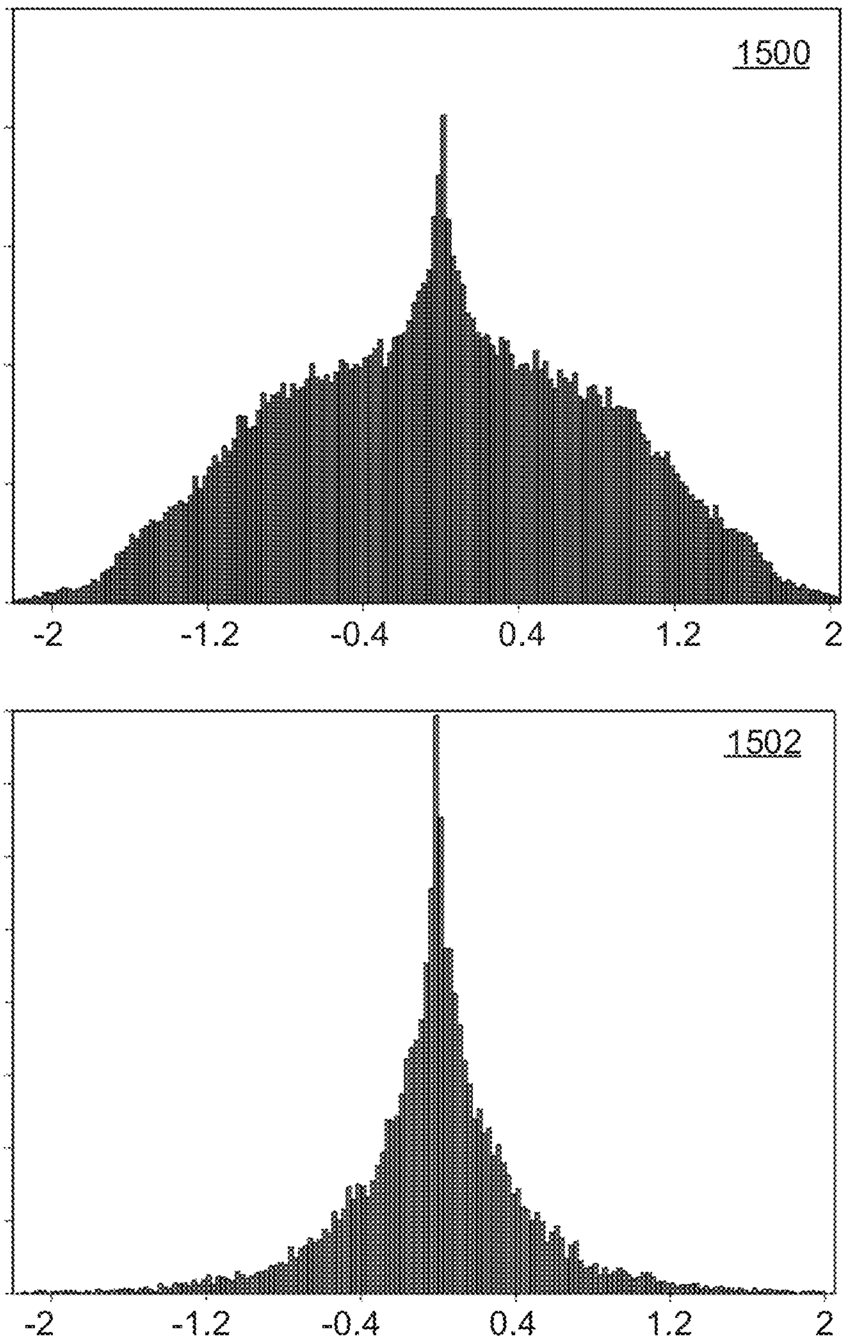
FIG. 15 shows graphs that illustrate a comparison between electron beam current density when a hollow cathode is used versus electron beam current density when a solid cathode is used.

Referring now to FIG. 15, graphs are shown that compare a current density at the target when a hollow cathode is used (1500) and a current density at the target when a solid cathode is used (1502). Each graph measures electron impact frequency on its vertical axis and measures distance from the beam's center on the horizontal axis. The hollow cathode graph 1500 clearly shows a more even distribution of electron impacts than is present in the solid cathode graph 1502.

One benefit of the present embodiments is that the hollow cathode's emitting surface generates a hollow electron beam, where the beam leaving the cathode lacks electrons at the center of the beam. As a result of this feature, the focusing effect of the LINAC 110 does not concentrate the electron beam as strongly at its center. Instead, and particularly for shorter LINACs, the beam profile impacting the target has a more uniform current distribution, as shown in graph 1500, than would be the case with an electron beam that enters the LINAC 110 with a continuous profile, as shown in graph 1502. This uniform current distribution distributes heating on the target better than can be achieved with a conventional cathode structure.

It should understood that when an element, such as a component, device, or other structure, is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of a triode electron gun (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A vacuum electron device (VED), comprising:

a hollow cathode having an emitting surface, configured to emit a beam of electrons, wherein a shape of the emitting surface is selected from the group consisting of a convex shape, a partially flat and partially concave shape, a partially flat and partially conical shape, and a partially flat and partially convex shape;

an anode configured to attach and focus the beam of electrons;

a control grid, having a same shape as the emitting surface, configured to control the beam of electrons emitted from the hollow cathode; and a cylinder that is substantially coaxial with the hollow cathode, configured to maintain a shape and trajectory of the emitted beam of electrons.

2. The VED of claim 1, further comprising a shadow grid configured to keep electrons in the electron beam from impacting the control grid, the shadow grid having a same shape as the emitting surface.

3. The VED of claim 2, wherein the shadow grid is positioned between the hollow cathode and the control grid.

4. The VED of claim 2, wherein the shadow grid is a hollow grid having an opening that is substantially coaxial with the hollow cathode.

5. The VED of claim 1, wherein the cylinder is positioned within an internal space of the hollow cathode and has an outer diameter that is smaller than a diameter of the internal space.

6. The VED of claim 1, wherein the control grid is a hollow grid having an opening that is substantially coaxial with the hollow cathode.

7. The VED of claim 1, wherein the cylinder is formed from a material that chemically reacts with an impregnating material of the hollow cathode to inhibit electron emission from the cylinder.

8. The VED of claim 1, wherein the cylinder is formed from a material selected from the group consisting of molybdenum and tungsten and is coated with a material that chemically reacts with an impregnating material of the hollow cathode to inhibit electron emission from the cylinder.

9. The VED of claim 1, wherein the cylinder is in the shape of a hollow cone.

10. The VED of claim 1, wherein the cylinder is maintained at a same potential voltage as the hollow cathode.

11. The VED of claim 1, wherein the electron beam emitted by the hollow cathode is a hollow beam, with no electrons at a center of its beam profile.

12. The VED of claim 1, wherein the emitting surface has a convex shape.

13. The VED of claim 1, wherein the emitting surface has a partially flat and partially concave shape, or a partially flat and partially conical shape.

14. The VED of claim 1, wherein the emitting surface has a partially flat and partially convex shape.

15. The VED of claim 1, further comprising a heat sink, positioned at an end of the hollow cathode that is opposite the non-concave emitting surface of the hollow cathode, to collect back-streaming electrons.

16. A linear accelerator, comprising:

an electron gun that includes:

a hollow cathode having an emitting surface, configured to emit a beam of electrons, wherein a shape of the emitting surface is selected from the group consisting of a convex shape, a partially flat and partially concave shape, a partially flat and partially conical shape, and a partially flat and partially convex shape;

an anode configured to attract and focus the beam of electrons;

a hollow grid, having a same shape as the emitting surface, configured to control the beam of electrons emitted from the hollow cathode; and a cylinder that is substantially coaxial with the hollow cathode, configured to maintain a shape and trajectory of the emitted beam of electrons; and a plurality of resonant cavities configured to accelerate the beam of electrons.

17. The linear accelerator of claim 16, wherein back-streaming electrons from the plurality of resonant cavities pass through the hollow cathode without impact.

18. The linear accelerator of claim 16, further comprising a shadow grid, having a same shape as the emitting surface, configured to keep forward moving electrons that are leaving the emitting surface from impacting the control grid.

19. The linear accelerator of claim 16, wherein the electron beam emitted by the hollow cathode is a hollow beam, with no electrons at a center of its beam profile.

* * * * *